US012066782B2

(12) United States Patent
Mizuno et al.

(10) Patent No.: US 12,066,782 B2
(45) Date of Patent: Aug. 20, 2024

(54) IMAGE FORMING SYSTEM

(71) Applicant: FUJIFILM BUSINESS INNOVATION CORP., Tokyo (JP)

(72) Inventors: Yuki Mizuno, Kanagawa (JP); Takayuki Fukamachi, Kanagawa (JP); Eri Fukui, Kanagawa (JP); Koji Kawano, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 29 days.

(21) Appl. No.: 17/940,329

(22) Filed: Sep. 8, 2022

(65) Prior Publication Data

US 2023/0213882 A1 Jul. 6, 2023

(30) Foreign Application Priority Data

Jan. 4, 2022 (JP) ................................ 2022-000047

(51) Int. Cl.
*G03G 15/00* (2006.01)

(52) U.S. Cl.
CPC ..... *G03G 15/6544* (2013.01); *G03G 15/6552* (2013.01); *G03G 15/6573* (2013.01); *G03G 2215/00877* (2013.01); *G03G 2215/00936* (2013.01)

(58) Field of Classification Search
CPC ........... G03G 15/6573; G03G 15/6552; G03G 2215/00936; G03G 15/6544; G03G 2215/0087; G03G 2215/00877
See application file for complete search history.

(56) References Cited

U.S. PATENT DOCUMENTS 4,640,611 A * 2/1987 Ohdake ................ G03G 15/231 399/408
2011/0084436 A1* 4/2011 Shirakuma ......... G03G 15/6541 270/37

FOREIGN PATENT DOCUMENTS

JP 2013-56758 A 3/2013

* cited by examiner

*Primary Examiner* — Jennifer Bahls
(74) *Attorney, Agent, or Firm* — Oliff PLC

(57) ABSTRACT

An image forming system that is capable of forming an image onto a sheet on a basis of print image data including multiple image data items imposed in such a manner as to be suitable for middle-folding and saddle-stitching and outputting a booklet by performing middle-folding and saddle-stitching includes: a storing unit that stores beforehand, as an output-processing content table, an inclination direction of a compilation tray onto which a stack of sheets that is to be subjected to imposition processing for pages or a facing page of the booklet and the middle-folding and saddle-stitching is placed; and a processing unit that generates the print image data by acquiring information of the inclination direction of the compilation tray, referencing to the output-processing content table, and performing the imposition processing.

15 Claims, 9 Drawing Sheets

FIG. 7

| MODEL OF POST-PROCESSING APPARATUS | INCLINATION DIRECTION OF COMPILATION TRAY | IMPOSITION PATTERN |
|---|---|---|
| MODEL A | FIRST DIRECTION | A |
| MODEL B | FIRST DIRECTION | A |
| MODEL C | SECOND DIRECTION | B |

IMAGE FORMING SYSTEM

CROSS-REFERENCE TO RELATED APPLICATIONS

This application is based on and claims priority under 35 USC 119 from Japanese Patent Application No. 2022-000047 filed Jan. 4, 2022.

BACKGROUND

(i) Technical Field

The present disclosure relates to an image forming system.

(ii) Related Art

There is known a post-processing apparatus including a stack-of-sheets forming unit that forms a stack of sheets by allowing a plurality of sheets to be stacked thereon, a binding unit that drives a binding needle through the stack of sheets formed by the stack-of-sheets forming unit and bends the ends of the binding needle so as to bind the stack of sheets, a folding unit that performs folding on a portion of the stack of sheets, the portion having been bound with the binding needle, and a needle detection unit that is disposed further downstream than the binding unit in a direction in which the stack of sheets is transported and further upstream than the folding unit in the direction and that detects the binding needle driven through the stack of sheets by the binding unit (Japanese Unexamined Patent Application Publication No. 2013-56758).

SUMMARY

Aspects of non-limiting embodiments of the present disclosure relate to changing an imposition pattern of a booklet in accordance with a direction in which a compilation tray of a post-processing apparatus is inclined.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming system that is capable of forming an image onto a sheet on a basis of print image data including a plurality of image data items imposed in such a manner as to be suitable for middle-folding and saddle-stitching and outputting a booklet by performing middle-folding and saddle-stitching includes: a storing unit that stores beforehand, as an output-processing content table, an inclination direction of a compilation tray onto which a stack of sheets that is to be subjected to imposition processing for pages or a facing page of the booklet and the middle-folding and saddle-stitching is placed; and a processing unit that generates the print image data by acquiring information of the inclination direction of the compilation tray, referencing to the output-processing content table, and performing the imposition processing.

BRIEF DESCRIPTION OF THE DRAWINGS

An exemplary embodiment of the present disclosure will be described in detail based on the following figures, wherein:

FIG. 7 is a table illustrating examples of a configuration of a post-processing apparatus and examples of an imposition pattern;

DETAILED DESCRIPTION

Figure 1:
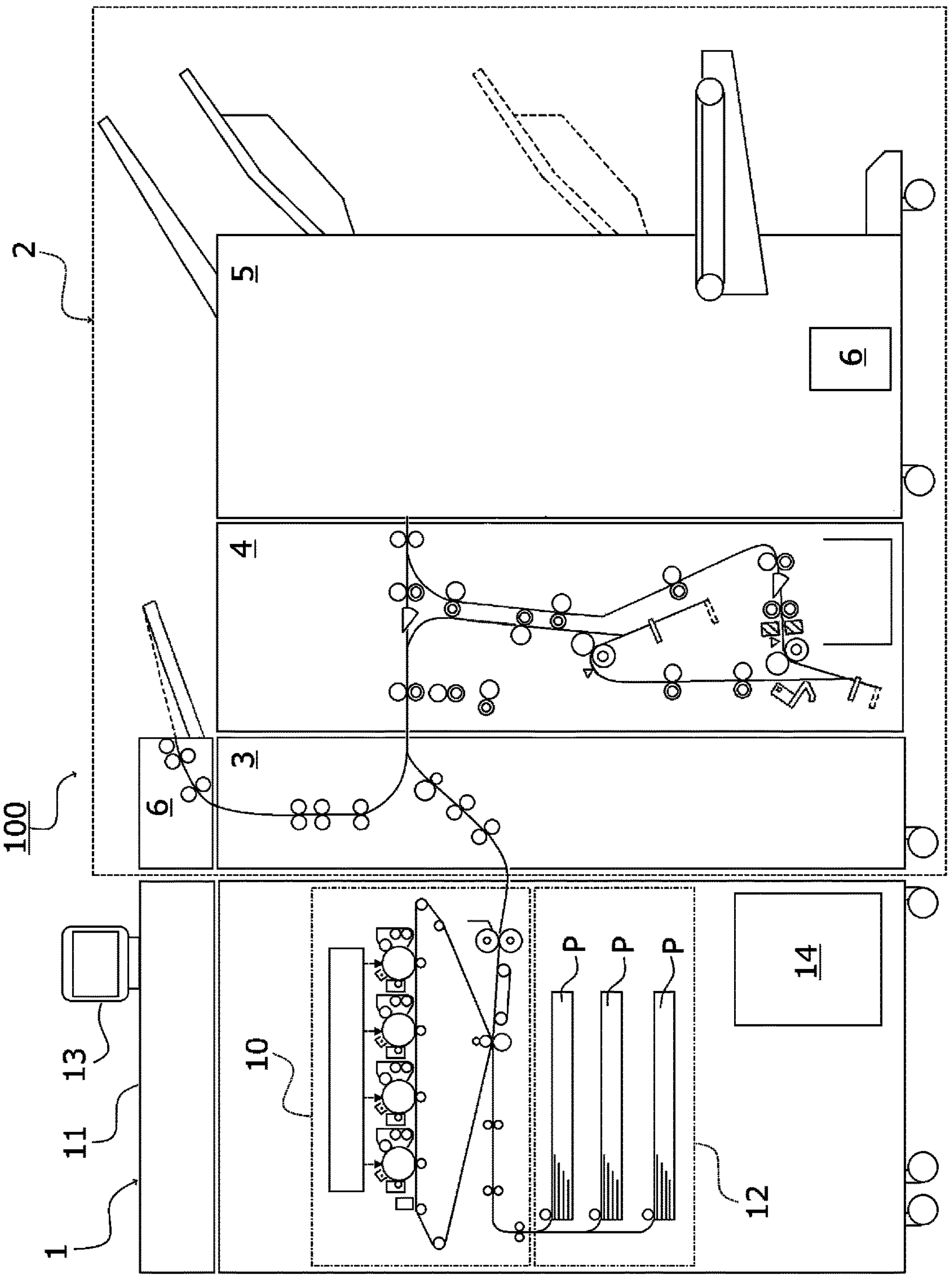
FIG. 1 is a schematic diagram illustrating a configuration of an image forming system according to the present exemplary embodiment.

Although an exemplary embodiment of the present disclosure will be described in detail below using a specific example and with reference to the drawings, the present disclosure is not limited to the exemplary embodiment and the specific example.

In addition, in the drawings that will be referred to in the following description, objects are schematically illustrated, and it should be noted that dimensional ratios and so forth of the objects that are illustrated in the drawings are different from those of actual objects. Furthermore, for ease of understanding, illustration of components that are not necessary for the following description is suitably omitted in the drawings.

(1) Overall Configuration and Operation of Image Forming System

FIG. 1 is a schematic diagram illustrating a configuration of an image forming system 100 according to the present exemplary embodiment. The image forming system 100 illustrated in FIG. 1 includes an image forming apparatus 1, such as a printer or a copying machine, that employs an electrophotographic system and forms an image and a post-processing apparatus 2 that performs post-processing on at least one of sheets P on which toner images have been formed by the image forming apparatus 1.

(1.1) Overall Configuration and Operation of Image Forming Apparatus

The image forming apparatus 1 includes an image forming device 10 that forms an image on the basis of image data, an image reading device 11 that generates read image data by reading an image from a document, a sheet-feeding device 12 that feeds the sheets P to the image forming section 10, a user interface 13 that receives an operation input from a user of the image forming system 100 and performs display of various information items to the user, and a controller 14 that performs overall operational control of the image forming system 100.

The image forming device 10 includes photoconductors. A charging unit, an exposure unit, a developing unit, a transfer unit, and a cleaning unit are arranged around each of the photoconductors. Each of the charging units uniformly charges the corresponding photoconductor. Each of the exposure units causes a light beam to scan on the basis of image data. Each of the developing units develops, with a toner, an electrostatic latent image that is formed as a result of the corresponding exposure unit performing scanning and irradiation. Each of the transfer units transfers a toner image developed on the corresponding photoconductor to one of the sheets P. Each of the cleaning units cleans the surface of the corresponding photoconductor after transfer of a toner image. The image forming device 10 further includes a fixing unit disposed on a transport path along which the sheets P are transported, and the fixing unit fixes a toner image that has been transferred to one of the sheets P onto the sheet P.

The user interface 13 has an input function for enabling a user who uses the user interface 13 to input instructions relating to a printing operation including a print execution instruction and a print canceling instruction and a display function for displaying information relating to a printing operation of the image forming apparatus 1.

The controller 14 receives a print execution instruction and performs predetermined processing on the basis of a control program so as to control the operation of the image forming apparatus 1. In other words, once a print execution instruction has been issued, the sheet-feeding device 12 is controlled to transport at least one of the sheets P, and the image forming device 10 is controlled to perform a printing operation on the basis of received image data.

Figure 2A:
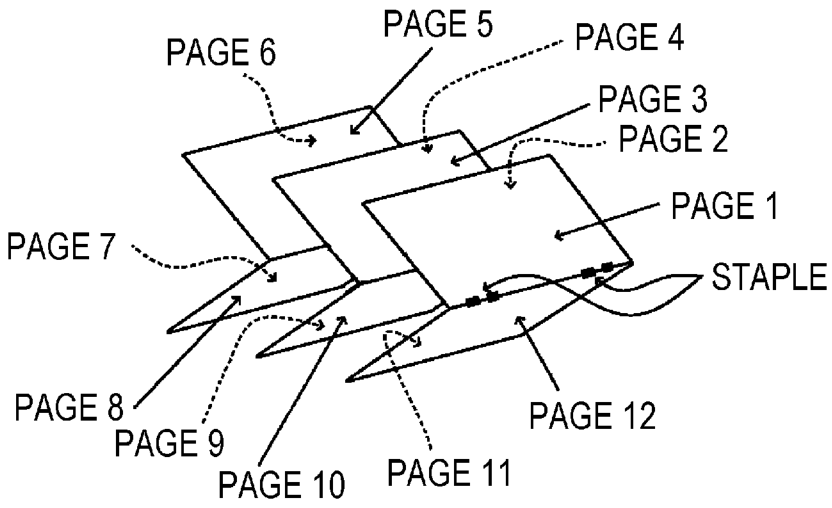
FIGS. 2A and 2B are diagrams illustrating an output form and imposition processing for "middle-folding and saddle-stitching"
Figure 2B:
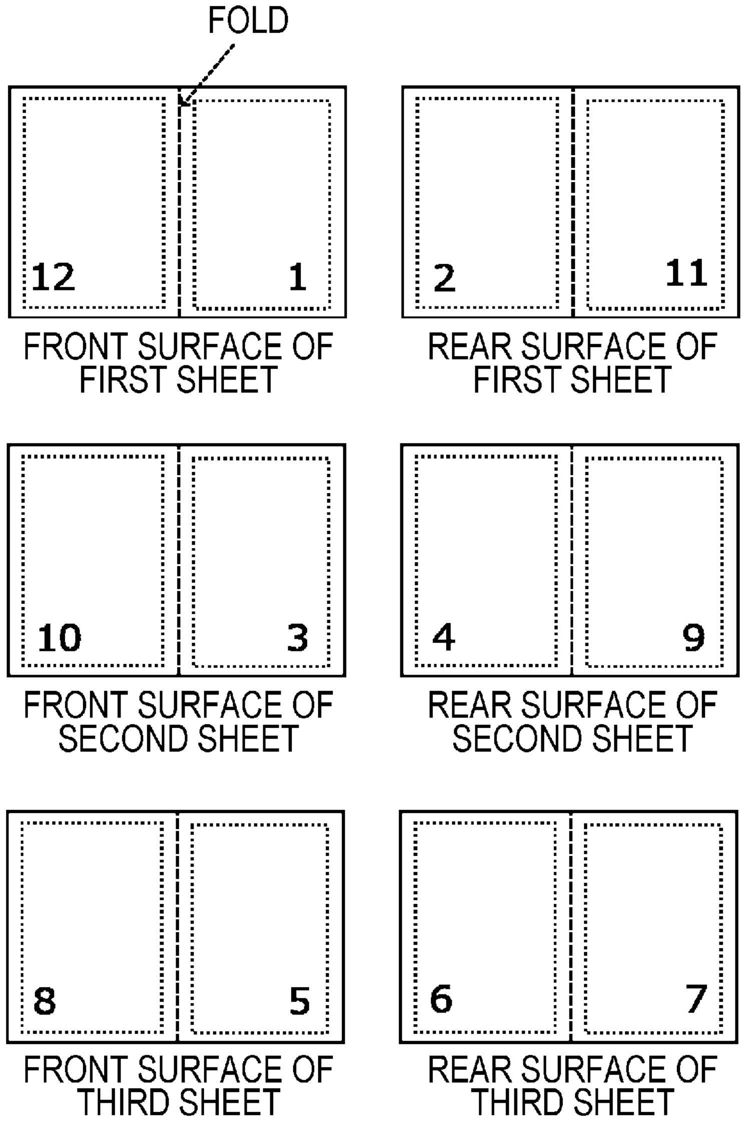

FIGS. 2A and 2B are diagrams illustrating an output form and imposition processing for "middle-folding and saddle-stitching".

The controller 14 functions as a processing unit that acquires information regarding the post-processing apparatus 2, which is mounted on the image forming apparatus 1, and outputs print image data including a plurality of image data items imposed in such a manner as to be suitable for the middle-folding and saddle-stitching.

As illustrated in FIG. 2A, in the "middle-folding and saddle-stitching", two or more of the sheets P, the two or more sheets P each including two pages, are folded and stapled at their center so as to bind a single booklet, and the pages of the booklet are arranged in order of page number.

The pages of the booklet illustrated in FIG. 2 are arranged in order of page number such that the left half of the outermost sheet P among the sheets P included in the booklet is the first page. However, the pages of the booklet may be arranged in order of page number such that the right half of the outermost sheet P is the first page.

Accordingly, as illustrated in FIG. 2B, in the case where a booklet has, for example, 12 pages in total, imposition is performed in the following manner. Page 12 and page 1 are output to the front surface of the first sheet. Page 2 and page 11 are output to the rear surface of the first sheet. Page 10 and page 3 are output to the front surface of the second sheet. Page 4 and page 9 are output to the rear surface of the second sheet. Page 8 and page 5 are output to the front surface of the third sheet. Page 6 and page 5 are output to the rear surface of the third sheet.

The post-processing apparatus 2 includes a transport device 3, a folding device 4, a finisher device 5, and a sheet-processing controller 6. The transport device 3 receives the sheets P on which images have been formed from the image forming apparatus 1 and transports the sheet P. The folding device 4 performs a folding operation on each of the sheets P transported thereto from the transport device 3. The finisher device 5 performs a final operation on each of the sheets P that have passed through the folding device 4. The sheet-processing controller 7 controls each functional unit of the post-processing apparatus 2.

Note that the controller 14 that is included in the image forming apparatus 1 and that performs overall operational control of the image forming system 100 may have the control function of the sheet-processing controller 6.

Figure 3:
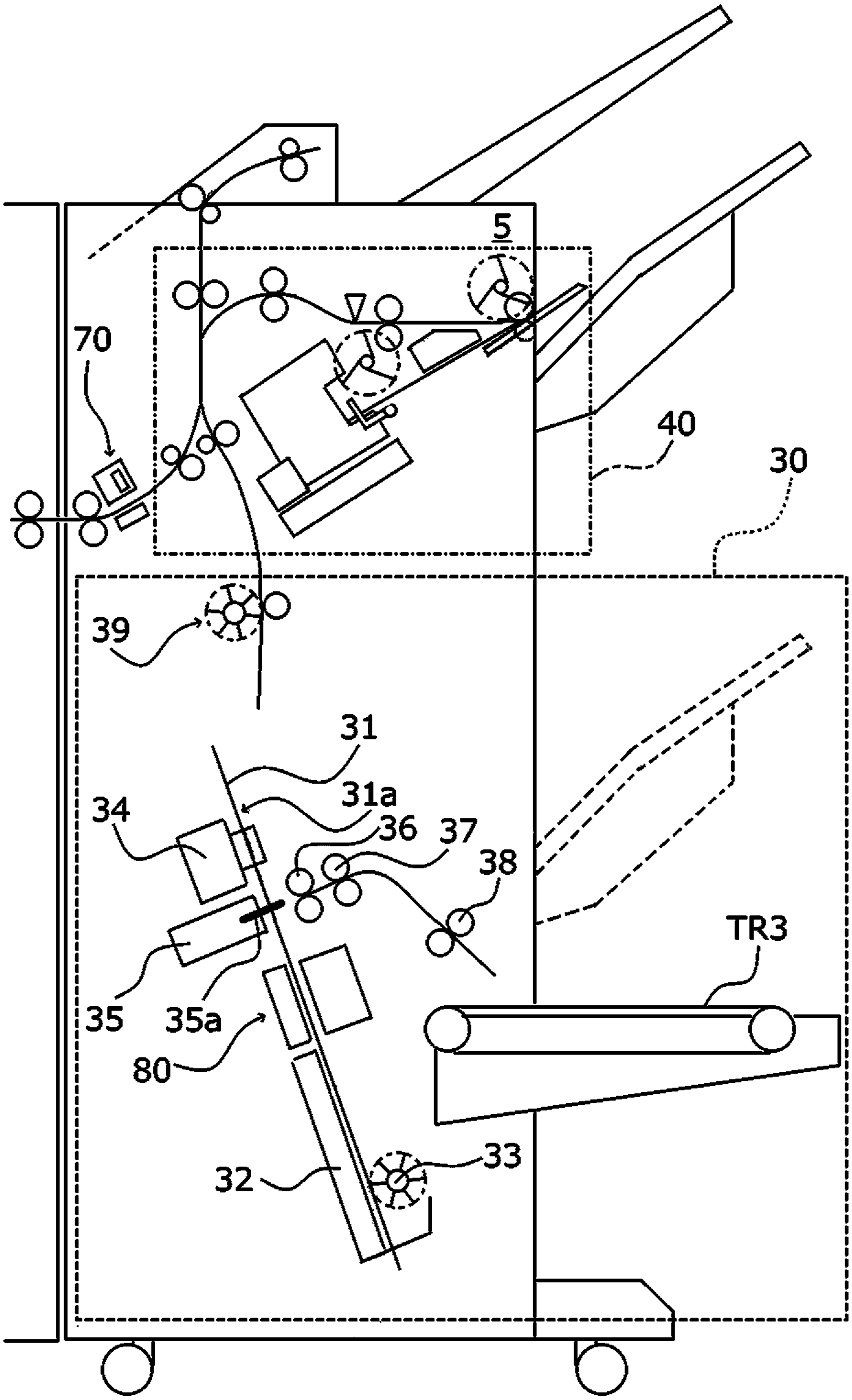
FIG. 3 is a diagram illustrating a configuration of a saddle-stitch-binding function unit included in a finisher device.
Figure 4:
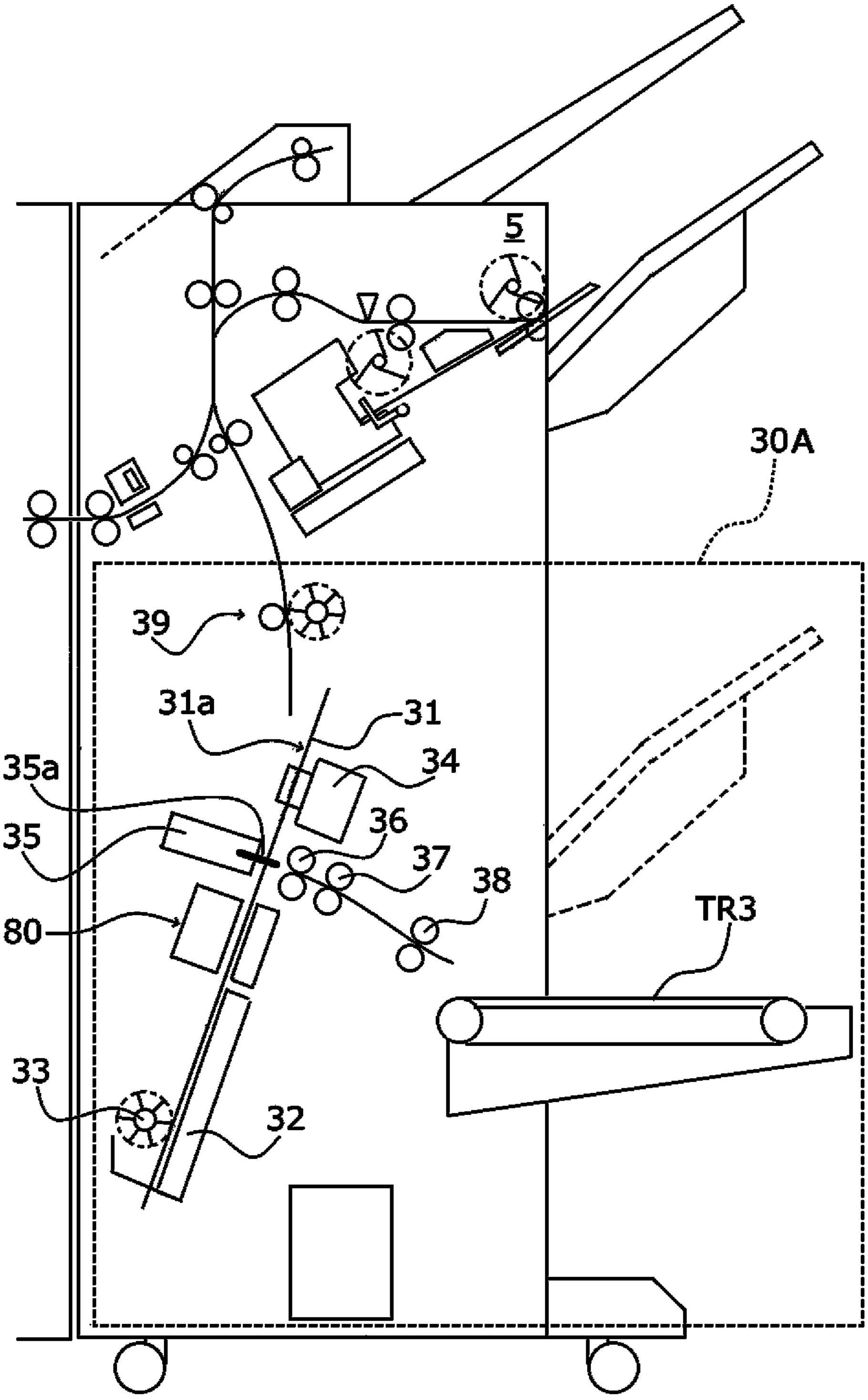
FIG. 4 is a diagram illustrating a configuration of another saddle-stitch-binding function unit included in the finisher device.

FIG. 3 is a diagram illustrating a configuration of a saddle-stitch-binding function unit 30 included in the finisher device 5, and FIG. 4 is a diagram illustrating a saddle-stitch-binding function unit 30A in which a compilation tray 31 is inclined in a direction different from a direction in which the compilation tray 31 is inclined in the saddle-stitch-binding function unit 30.

The finisher device 5 includes a punching function unit 70, a side-stitching function unit 40, and the saddle-stitch-binding function unit 30. The punching function unit 70 performs punching on the sheets P (punches, for example, two holes or four holes in the sheets P). The side-stitching function unit 40 allows a necessary number of the sheets P to be stacked on top of one another so as to form a stack of sheets PB and performs a binding operation (side stitching) on an end portion of the stack of sheets PB. The saddle-stitch-binding function unit 30 allows a necessary number of the sheets P to be stacked on top of one another so as to form the stack of sheets PB and performs a binding operation (saddle stitching) on a center portion of the stack of sheets PB so as to bind a booklet.

The saddle-stitch-binding function unit 30 includes the compilation tray 31, a transport roller 39, and an end guide 32. The compilation tray 31 allows a predetermined number of the sheets P on each of which an image has been formed to be stacked thereon. The transport roller 39 transports the sheets P one at a time into the compilation tray 31. The end guide 32 moves along the compilation tray 31 while the stack of sheets PB is placed on a positioning stopper, which is provided on the compilation tray 31 in a protruding manner, and determines a saddle-stitching position and a folding position of the stack of sheets PB.

The saddle-stitch-binding function unit 30 further includes a sheet-aligning paddle 33 and a sheet-width-aligning member 34. The sheet-aligning paddle 33 aligns the sheets P stacked on the compilation tray 31 toward the end guide 32. The sheet-width-aligning member 34 aligns the sheets P, which are stacked on the compilation tray 31, in a width direction of the sheets P.

In addition, the saddle-stitch-binding function unit 30 includes a stapler 80, a folding mechanism 35, and folding rollers 36. The stapler 80 performs a binding operation by driving a binding needle through the stack of sheets PB on the compilation tray 31. The folding mechanism 35 includes a folding knife 35*a* that moves with respect to the stack of sheets PB that has undergone the binding operation in such a manner as to project in a direction from the backside of the compilation tray 31 toward a placement surface 31*a* of the compilation tray 31. The folding rollers 36 are a pair of rollers and nip the stack of sheets PB once the folding knife 35*a* starts folding the stack of sheets PB.

The saddle-stitch-binding function unit 30 further includes transport rollers 37, the booklet tray TR3, and transport rollers 38. The transport rollers 37 are disposed downstream from the folding rollers 36 and transport the stack of sheets PB that has been folded into a booklet by the folding mechanism 35 and the folding rollers 36. The stack of sheets PB in the form of a booklet is to be placed on the booklet tray TR3, and the transport rollers 38 transport the stack of sheets PB to the booklet tray TR3.

Examples of the saddle-stitch-binding function unit 30 that performs saddle stitching on the center portion of the stack of sheets PB so as to bind a booklet include the saddle-stitch-binding function unit 30 in which the inclination angle of the compilation tray 31 is the same as a first direction that is inclined toward an upstream side in a direction in which the sheets P are transported toward the compilation tray 31 as illustrated in FIG. 3 and the saddle-stitch-binding function unit 30A in which the inclination angle of the compilation tray 31 is the same as a second direction that is inclined toward a downstream side in the direction in which the sheets P are transported toward the compilation tray 31 as illustrated in FIG. 4.

Figure 5B:
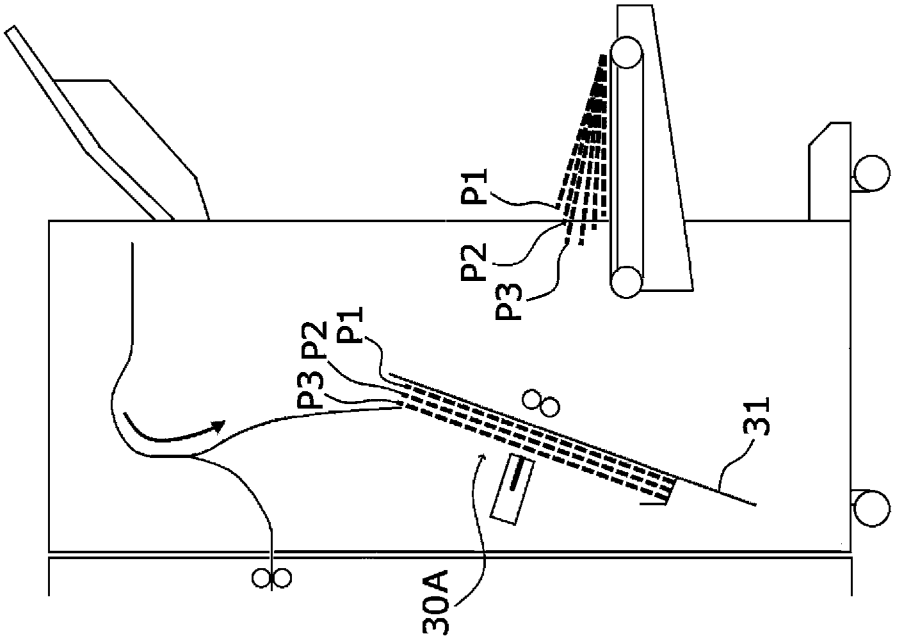
FIGS. 5A and 5B are diagrams illustrating saddle-stitch-binding function units in which a compilation tray is inclined in different directions.
Figure 5A:
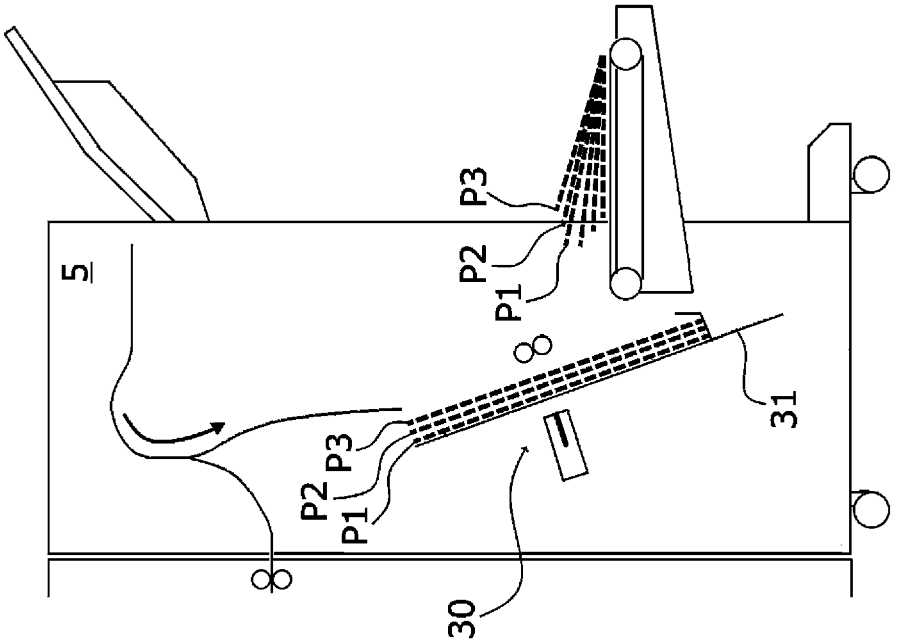

FIGS. 5A and 5B are diagrams illustrating the order of the sheets that are stacked on the compilation tray 31 and the order of the pages of a booklet that has undergone the folding operation.

In the saddle-stitch-binding function unit 30 in which the compilation tray 31 is inclined in the first direction, when the folding operation is performed on the stack of sheets PB on the compilation tray 31, as illustrated in FIG. 5A, a first sheet P1 that is one of the sheets P and that has been placed first on the compilation tray 31 becomes the innermost sheet P among the sheets P included in a booklet. In the saddle-stitch-binding function unit 30A in which the compilation tray 31 is inclined in the second direction, when the folding operation is performed on the stack of sheets PB on the compilation tray 31, as illustrated in FIG. 5B, the first sheet P1 becomes the outermost sheet P among the sheets P included in a booklet.

Thus, in the post-processing apparatus 2 mounted on the image forming apparatus 1, when the inclination direction of the compilation tray 31 of the saddle-stitch-binding function unit 30 is changed, it is necessary to change a setting of imposition that is performed by the image forming apparatus 1.

In the image forming system 100 in the present exemplary embodiment, the controller 14 acquires information relating to the configuration of the post-processing apparatus 2 mounted on the image forming apparatus 1 and changes an imposition pattern by referencing to an output-processing content table that is related to the inclination angle of the compilation tray 31, which is one of the components of the post-processing apparatus 2.

(2) Imposition Processing (2.1) Imposition Setting

Figure 6:
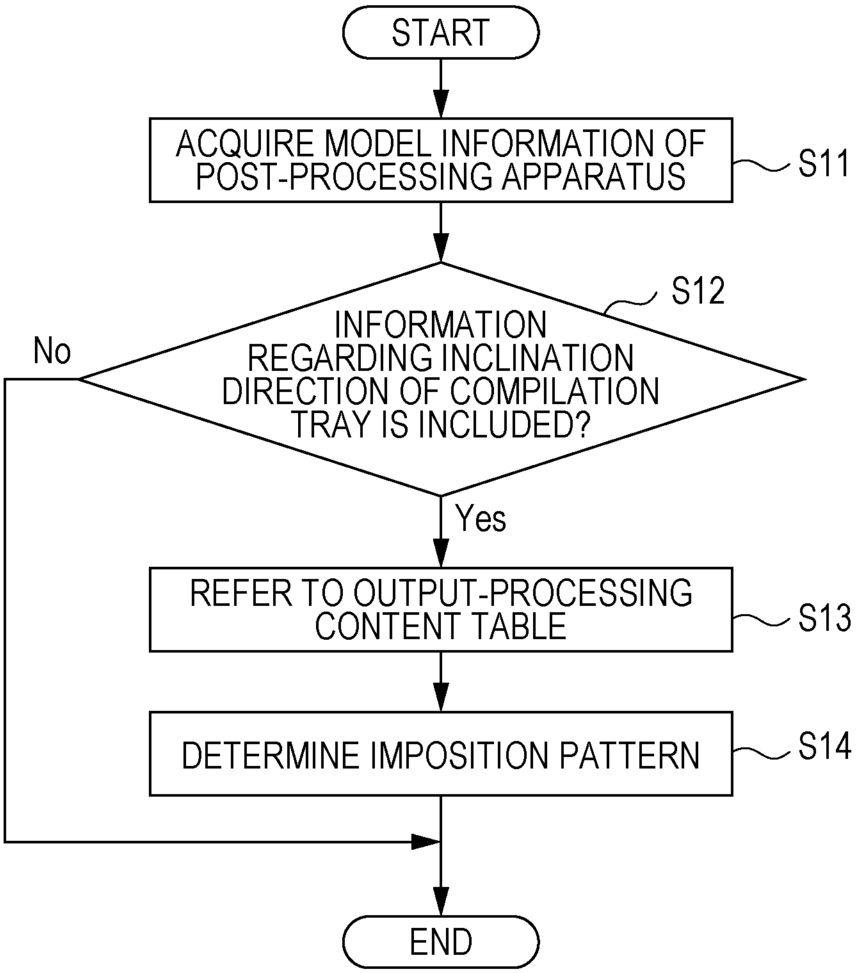
FIG. 6 is a flowchart illustrating a flow of imposition determination that is performed by a controller.

FIG. 6 is a flowchart illustrating the flow of imposition determination that is performed by the controller 14, and FIG. 7 is the output-processing content table containing examples of the configuration of the post-processing apparatus and examples of the imposition pattern.

Once the image forming apparatus 1 has been switched on, the controller 14 acquires information relating to the model of the post-processing apparatus 2 mounted on the image forming apparatus 1 (S11). The model information of the post-processing apparatus 2 includes the inclination angle of the compilation tray 31 of the saddle-stitch-binding function unit 30. The two types of the inclination angle of the compilation tray 31 are the first direction, which is inclined toward the upstream side in the direction in which the sheets P are transported toward the compilation tray 31, and the second direction, which is inclined toward the downstream side in the direction in which the sheets P are transported toward the compilation tray 31.

Subsequently, it is determined whether the information of the inclination direction of the compilation tray 31 is included in the acquired information relating to the model of the post-processing apparatus 2 (S12).

When the information of the inclination direction of the compilation tray 31 is included (Yes in S12), the controller 14 refers to the output-processing content table (hereinafter simply referred to as "table") that is stored in a memory 15 serving as a storing unit and that contains at least one combination of the configuration of the post-processing apparatus 2 and an imposition pattern (S13). As illustrated in FIG. 7, the table contains at least one combination of the model of the post-processing apparatus 2, the inclination direction of the compilation tray 31 of the saddle-stitch-binding function unit 30, and the imposition pattern.

The controller 14 determines the imposition pattern from the table referred to in step S13 on the basis of the information that has been acquired in step S12 and that relates to the model of the post-processing apparatus 2 mounted on the image forming apparatus 1 (S14). When the information of the inclination direction of the compilation tray 31 is not included (No in S12), the controller 14 does not perform imposition setting with reference to the table.

Note that the information of the inclination direction of the compilation tray 31 of the saddle-stitch-binding function unit 30 may be acquired in accordance with an input from the user interface 13.

(2.2) Imposition Pattern

Figure 8A:
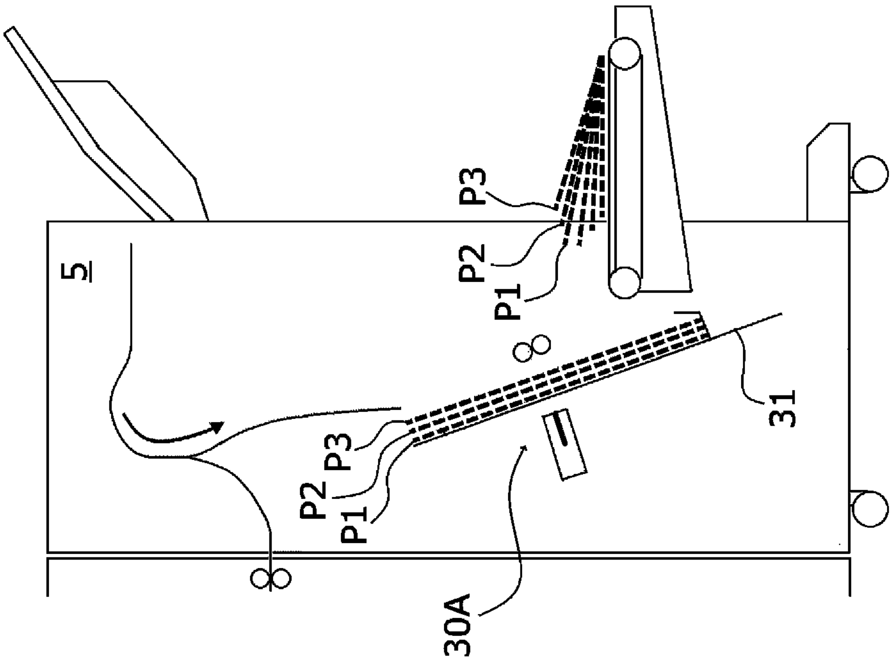
FIGS. 8A and 8B are respectively a diagram illustrating a state where a plurality of sheets are stacked as a stack of sheets in the saddle-stitch-binding function unit in which the inclination direction of the compilation tray is the same as a first direction that is inclined toward an upstream side in a direction in which the sheets are transported toward the compilation tray and a diagram illustrating an imposition order.
Figure 8B:
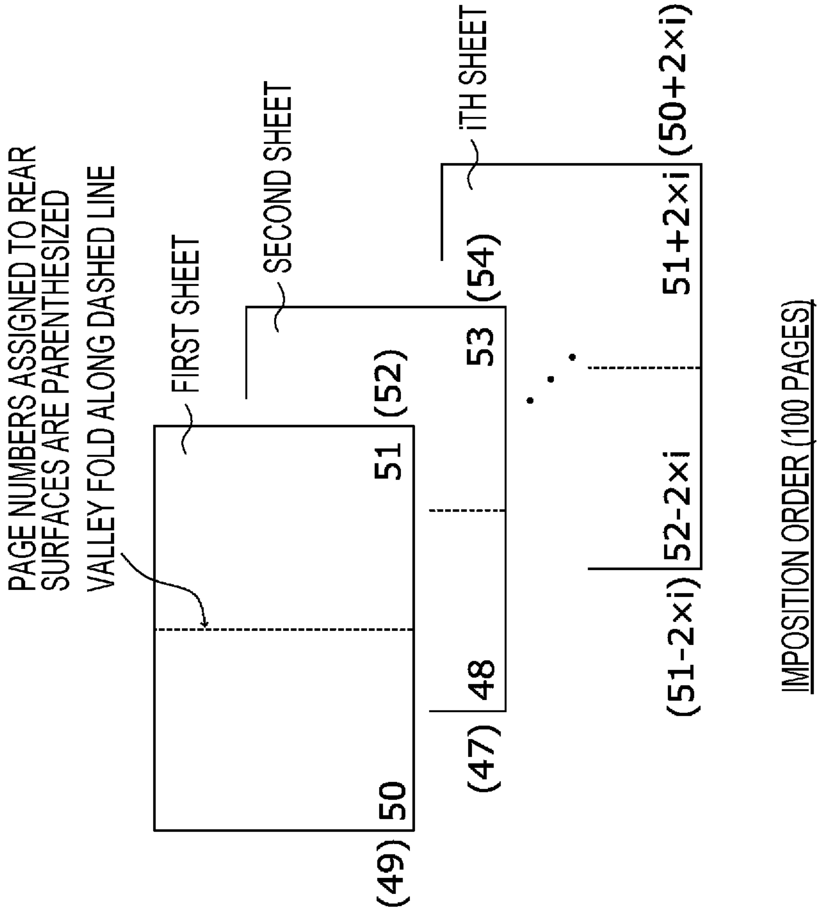

FIG. 8A is a diagram illustrating a state where the sheets P are stacked as the stack of sheets PB in the saddle-stitch-binding function unit 30A in which the compilation tray 31 is inclined in the first direction, which is inclined toward the upstream side in the direction in which the sheets P are transported toward the compilation tray 31, and FIG. 8B is a diagram illustrating an imposition order.

When the compilation tray 31 is inclined in the first direction, the first sheet P1 becomes the innermost sheet of a booklet as illustrated in FIG. 8A. Accordingly, in the case of outputting a booklet having n pages (n is an integer of one or more), as illustrated in FIG. 8B, page $n/2-2\times i+2$ and page $n/2+2\times i-1$ are imposed on one surface of the ith sheet placed on the compilation tray 31, the one surface facing the upstream side in the direction in which the sheets P are transported, and page $n/2-2\times i+1$ and page $n/2+2\times i$ are imposed on the other surface of the ith sheet placed on the compilation tray 31, the other surface facing the downstream side in the direction in which the sheets P are transported.

More specifically, when imposition of, for example, 100 pages in total is performed, the imposition is performed in the following manner. Page 50 and page 51 are output to the front surface of the first sheet. Page 49 and page 52 are output to the rear surface of the first sheet. Page 48 and page 53 are output to the front surface of the second sheet. Page 47 and page 54 are output to the rear surface of the second sheet. Page $50-2\times i$ and page $51+2\times i$ are output to the front surface of the ith sheet. Page $51-2\times i$ and page $50+2\times i$ are output to the rear surface of the ith sheet.

Figure 9B:
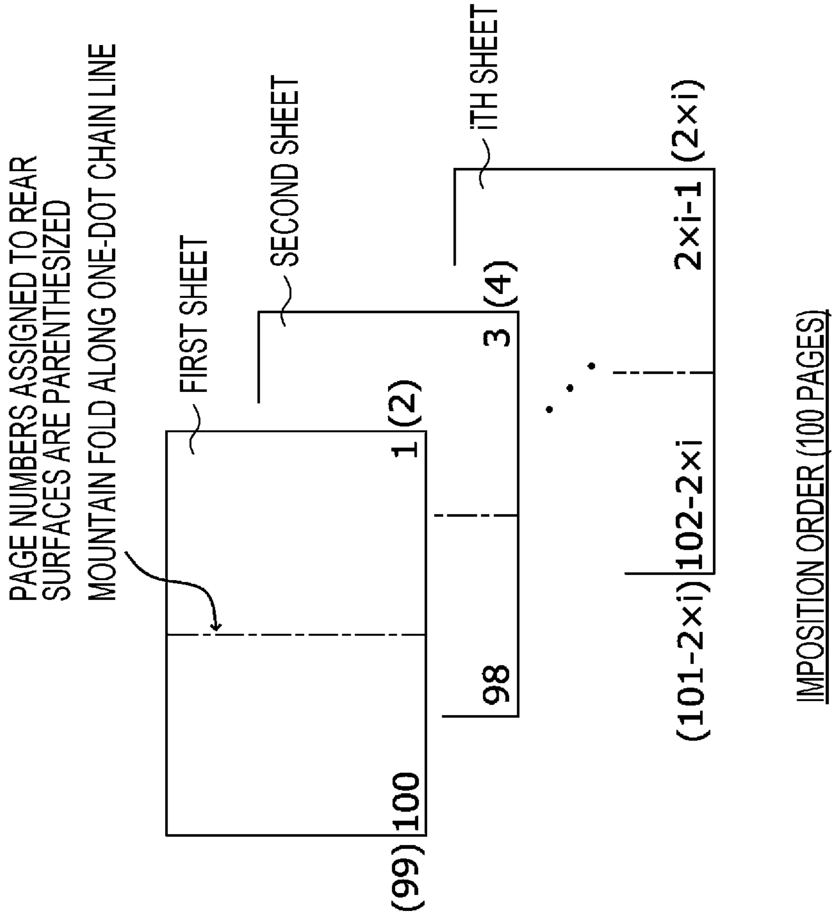
FIGS. 9A and 9B are respectively a diagram illustrating a state where a plurality of sheets are stacked as a stack of sheets in the other saddle-stitch-binding function unit in which the inclination direction of the compilation tray is the same as a second direction that is inclined toward a downstream side in the direction in which the sheets are transported toward the compilation tray and a diagram illustrating an imposition order.
Figure 9A:
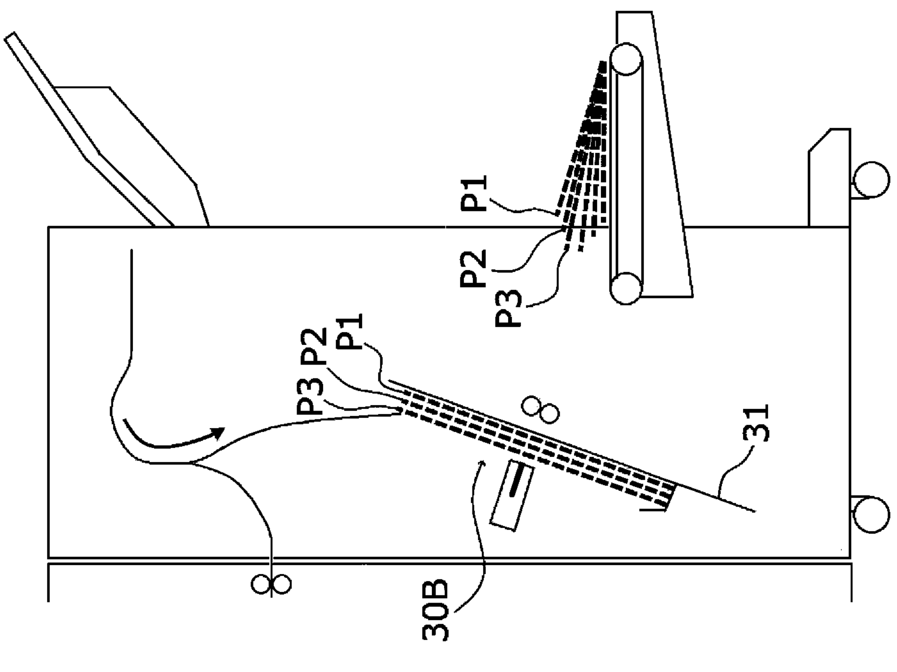

FIG. 9A is a diagram illustrating a state where the sheets P are stacked as the stack of sheets PB in the saddle-stitch-binding function unit 30A in which the compilation tray 31 is inclined in the second direction, which is inclined toward the downstream side in the direction in which the sheets P are transported toward the compilation tray 31, and FIG. 9B is a diagram illustrating an imposition order.

When the compilation tray 31 is inclined in the second direction, the first sheet P1 becomes the outermost sheet of a booklet as illustrated in FIG. 9A. Accordingly, in the case of outputting a booklet having n pages (n is an integer of one or more), as illustrated in FIG. 9B, page 2×i and page n−2×i+1 are imposed on one surface of the ith sheet placed on the compilation tray 31, the one surface facing the upstream side in the direction in which the sheets P are transported, and page 2×i−1 and page n−2×i+2 are imposed on the other surface of the ith sheet placed on the compilation tray 31, the other surface facing the downstream side in the direction in which the sheets P are transported.

More specifically, when imposition of, for example, 100 pages in total is performed, the imposition is performed in the following manner. Page 100 and page 1 are output to the front surface of the first sheet. Page 99 and page 2 are output to the rear surface of the first sheet. Page 98 and second sheet. Page 102−2×i and page 2×i−1 are output to the front surface of the ith sheet. Page 101−2×i and page 2×i are output to the rear surface of the ith sheet.

In the image forming system 100 according to the present exemplary embodiment, the model information of the post-processing apparatus 2 mounted on the image forming apparatus 1 is acquired, and a booklet imposition method is changed in accordance with the configuration of the post-processing apparatus 2.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming system that is capable of forming an image onto a sheet on a basis of print image data including a plurality of image data items imposed in such a manner as to be suitable for middle-folding and saddle-stitching and outputting a booklet by performing middle-folding and saddle-stitching, the image forming system comprising:

a compilation tray having a placement surface on which a plurality of sheets are stacked as a transport roller transports one sheet at a time after an image is formed on the one sheet;

a folding mechanism including a folding knife that is positioned and configured to project from a backside of the compilation tray to the placement surface of the compilation tray; and a processor programmed to:

determine whether an inclination direction of the compilation tray is a first direction or a second direction, wherein the compilation tray inclined in the first direction is inclined toward an upstream side in a direction in which sheets are transported toward the compilation tray, and the compilation tray inclined in the second direction is inclined toward a downstream side in the direction in which the sheets are transported toward the compilation tray;

upon determining that the inclination direction of the compilation tray is the first direction, generate the print image data so that a first sheet, which is placed on the compilation tray first so as to contact the placement surface, has image for an innermost sheet in the booklet; and upon determining that the inclination direction of the compilation tray is the second direction, generate the print image data in a different order so that the first sheet, which is placed on the compilation tray first so as to contact the placement surface, has image for an outermost sheet in the booklet.

2. The image forming system according to claim 1, wherein, when a booklet having n pages (n is an integer of one or more) is output while the inclination direction of the compilation tray is the first direction, page n/2−2×i+2 and page n/2+2×i−1 are imposed on one surface of the ith sheet placed on the compilation tray, the one surface facing the upstream side in the direction in which the sheets are transported, and page n/2−2×i+1 and page n/2+2×i are imposed on another surface of the ith sheet placed on the compilation tray, the other surface facing the downstream side in the direction in which the sheets are transported.

3. The image forming system according to claim 2, wherein the processor acquires information of the inclination direction of the compilation tray in accordance with a type of a post-processing apparatus that is actually included in the image forming system.

4. The image forming system according to claim 3, wherein, when the information of the inclination direction of the compilation tray is not acquired, an imposition processing with reference to an output-processing content table is not performed.

5. The image forming system according to claim 2, further comprising:

an input unit, wherein the processor acquires information of the inclination direction of the compilation tray in accordance with an input from the input unit.

6. The image forming system according to claim 5, wherein, when the information of the inclination direction of the compilation tray is not acquired, an imposition processing with reference to an output-processing content table is not performed.

7. The image forming system according to claim 1, wherein, when a booklet having n pages (n is an integer of one or more) is output while the inclination direction of the compilation tray is the second direction, page 2×i and page n−2×i+1 are imposed on one surface of the ith sheet placed on the compilation tray, the one surface facing the upstream side in the direction in which the sheets are transported, and page 2×i−1 and page n−2×i+2 are imposed on another surface of the ith sheet placed on the compilation tray, the other surface facing the downstream side in the direction in which the sheets are transported.

8. The image forming system according to claim 7, wherein the processor acquires information of the inclination direction of the compilation tray in accordance with a type of a post-processing apparatus that is actually included in the image forming system.

9. The image forming system according to claim 8, wherein, when the information of the inclination direction of the compilation tray is not acquired, an imposition processing with reference to an output-processing content table is not performed.

10. The image forming system according to claim 7, further comprising:

an input unit, wherein the processor acquires information of the inclination direction of the compilation tray in accordance with an input from the input unit.

11. The image forming system according to claim 10, wherein, when the information of the inclination direction of the compilation tray is not acquired, an imposition processing with reference to an output-processing content table is not performed.

12. The image forming system according to claim 1, wherein the processor acquires information of the inclination direction of the compilation tray in accordance with a type of a post-processing apparatus that is actually included in the image forming system.

13. The image forming system according to claim 12, wherein, when the information of the inclination direction of the compilation tray is not acquired, an imposition processing with reference to an output-processing content table is not performed.

14. The image forming system according to claim 1, further comprising:

an input unit, wherein the processor acquires information of the inclination direction of the compilation tray in accordance with an input from the input unit.

15. The image forming system according to claim 14, wherein, when the information of the inclination direction of the compilation tray is not acquired, an imposition processing with reference to an output-processing content table is not performed.

* * * * *